United States Patent [19]
Ito et al.

[11] Patent Number: 5,160,115
[45] Date of Patent: Nov. 3, 1992

[54] DEVICE FOR OPERATING A DAMPER IN AN AIR CONDITIONING SYSTEM FOR A VEHICLE

[75] Inventors: Koichi Ito, Kariya; Akihito Higashihara, Chiryu; Hikaru Sugi, Nagoya, all of Japan

[73] Assignee: Nippondenso Co., Ltd., Kariya, Japan

[21] Appl. No.: 809,443

[22] Filed: Dec. 19, 1991

[51] Int. Cl.$^5$ .......................... F16K 31/04; B60H 1/00
[52] U.S. Cl. ........................... 251/129.12; 251/129.11; 251/901; 185/40 R
[58] Field of Search ...................... 251/129.11, 129.12, 251/901; 185/40 R

[56] References Cited

U.S. PATENT DOCUMENTS 4,203,573  5/1980  Boss .................................. 185/40 R

FOREIGN PATENT DOCUMENTS

64-36515  2/1989  Japan .
1-141116  6/1989  Japan .
1-186415  7/1989  Japan .

Primary Examiner—Arnold Rosenthal
Attorney, Agent, or Firm—Cushman, Darby & Cushman

[57] ABSTRACT

The apparatus for controlling a damper in an air conditioning system for a vehicle. The damper is used for selectively opening air outlets, and is constructed as a film damper having one end wound on a drive shaft rotatably supported in a casing. The drive shaft is formed as a hollow shaft having an axial bore therein, in which an electric motor with a reduction gear is arranged. The outer body of the motor is fixedly inserted to the shaft, and has an output shaft fixedly connected to the casing, so that a rotation of the motor causes a relative rotation between the motor body connected to the hollow shaft and the outlet shaft connected to the casing. As a result of the rotation of the motor body, the drive shaft is rotated, resulting in a desired movement of the film damper.

11 Claims, 8 Drawing Sheets

DEVICE FOR OPERATING A DAMPER IN AN AIR CONDITIONING SYSTEM FOR A VEHICLE

BACKGROUND OF THE INVENTION

1. Field of the Invention

The present invention relates to a device for operating a damper in an air conditioning system for a vehicle.

2. Description of Related Art

Known in the prior art is an air conditioning system for a vehicle provided with a casing having a plurality of outlets for discharging flows of air into a cabin of the vehicle, dampers for selectively opening or closing the outlets, and a rotary drive device for each respective damper. See Japanese Unexamined Patent Publication No. 1-141116. The rotary drive device comprises an arm holding the damper at one end thereof, a shaft to which the other end of the arm is fixedly connected, a lever connected to the shaft at an end thereof remote from the arm, and an actuator associated with and obtaining a rotary movement of the lever. Usually, an actual arrangement of the air conditioning system in a vehicle will require the provision of a link mechanism between the lever and the actuator, for transmitting the movement of the actuator to the lever, and further, the lever, the actuator and the link mechanism will be arranged outside the casing of the air conditioning apparatus, but such an arrangement of the lever, the actuator, and the link mechanism outside the casing is disadvantageous, in that the system occupies a substantial space when mounted in the vehicle.

SUMMARY OF THE INVENTION

An object of the present invention is to provided a device for operating a damper in an air conditioning apparatus for a vehicle, by which the space required for mounting the system in the vehicle is reduced.

According to the present invention, a flow control apparatus is provided for an air-conditioning system for a vehicle, for controlling a flow of air from an air flow source to a receiver of the flow of air, the flow control apparatus comprising:

a casing defining therein a passageway having one end connected to the air flow source and the other end connected to the air flow receiver;

a damper arranged in the passageway for controlling the degree of opening of the passageway, and;

drive means for operating the damper, the drive means comprising a hollow shaft rotatably connected to the casing, the hollow shaft defining therein an axially extending bore and being connected to the damper, and a motor arranged in the bore and having a body and an output shaft rotatable to the body, the output shaft of the motor being connected in relation to the casing, and the motor body being fitted to the hollow shaft, whereby an energization of the motor body obtains a relative rotation of the body and the output shaft, which allows the hollow shaft to be rotated with respect to the casing, to thus move the damper for an operation thereof.

According to the present invention, a motor rotating the damper is arranged inside a drive shaft rotatable with respect to the casing. Namely, the entire drive apparatus is housed in the casing, and as a result, a space required for storing the air-conditioning system inside the vehicle is considerably reduced.

DESCRIPTION OF THE PREFERRED EMBODIMENTS

Figure 1:
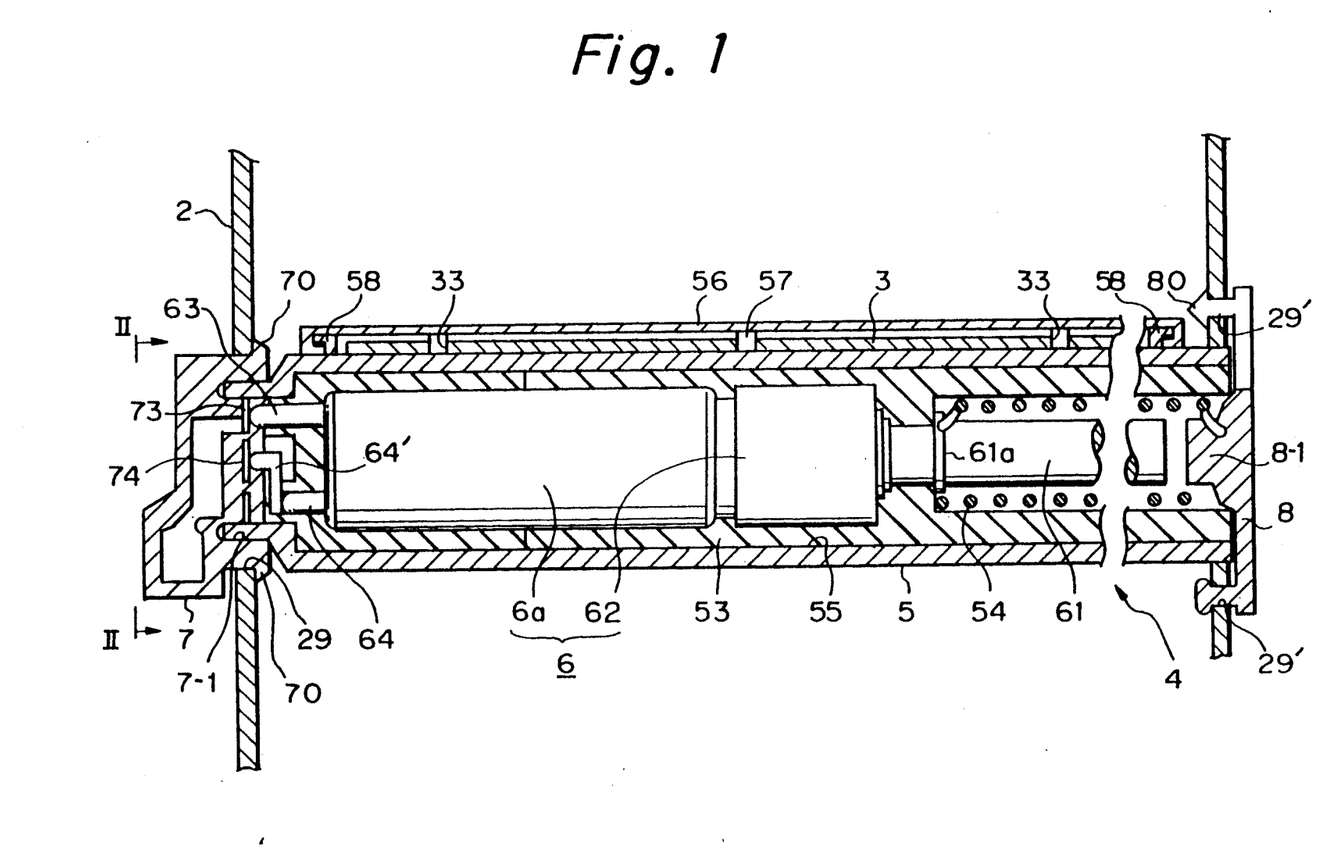
FIG. 1 is a longitudinal cross sectional view of the drive shaft as a first embodiment of the present invention.
Figure 2:
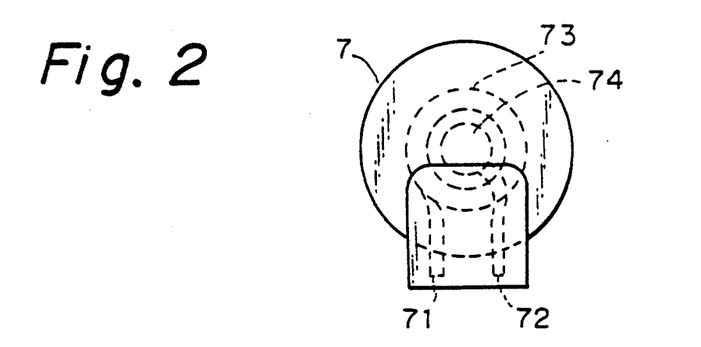
FIG. 2 is a side view taken along the line II—II in FIG. 1.
Figure 3:
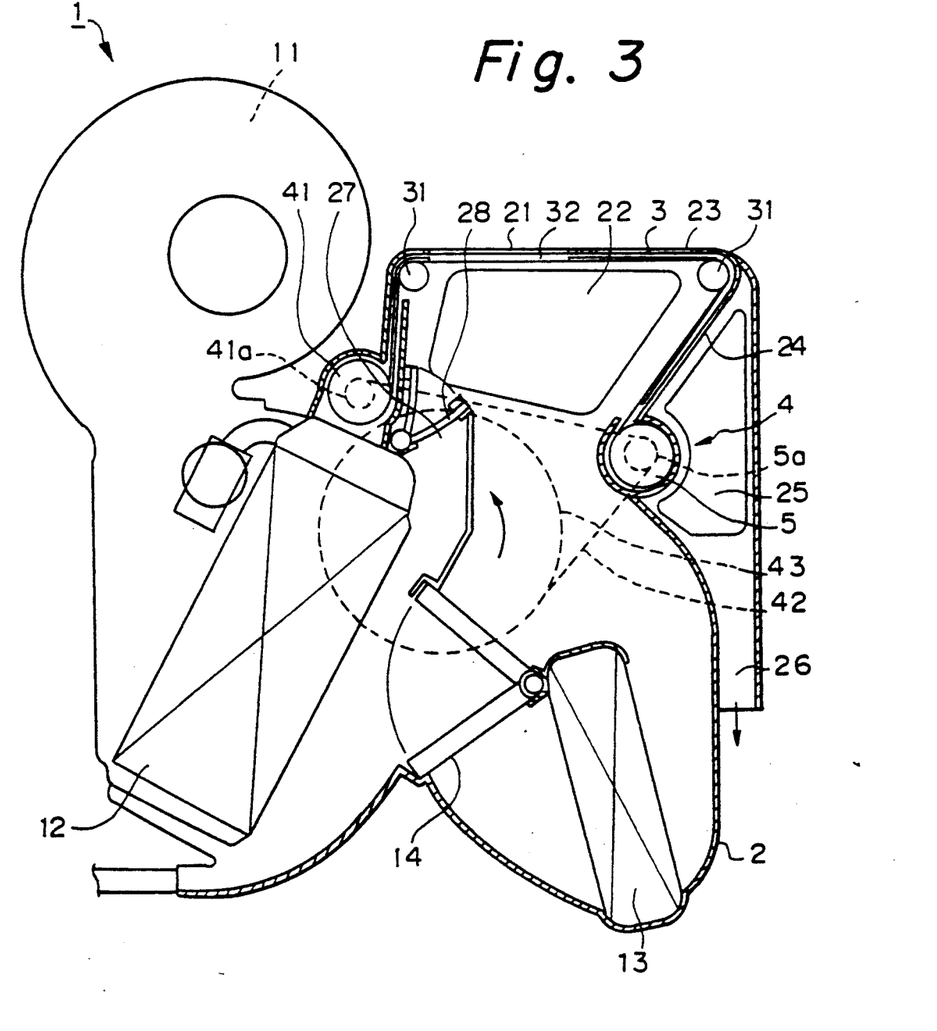
FIG. 3 show an entire view of an air conditioning system for a vehicle having the drive shaft shown in FIG. 1 and operating a film damper.

Embodiments of the present invention will be described with reference to attached drawings. FIGS. 1 to 3 show a first embodiment of the present invention; FIGS. 1 and 2 show the drive device, and FIG. 3 shows an entire view of the drive device for a damper when in an air conditioning apparatus for a vehicle. The air conditioning apparatus 1 has a casing 2 to which a blower 11 is connected, and an evaporator 12 and a heater core 13 are arranged in the casing 2. The blower 11 generates an air flow directed to a cabin (not shown) of the vehicle. The evaporator 12 is located in a stage of a refrigerating cycle in such a manner that a heat exchange of the air flow with the cooling medium passing inside the evaporator 12 is carried out, for cooling the air flow. The heater core 13 has an inner passageway (not shown) connected to a water jacket of an internal combustion engine (not shown), so that a hot engine cooling water from the water jacket is introduced into the inner passageway of the heater core 13, whereby a heat exchange of the air flow to the engine cooling water is carried out to warm up the air flow and obtain a desired temperature of the air. An air mix damper 14 is arranged upstream of the heater core 13, for controlling the ratio of the amount of air passing through the heater core 13 to the amount of air by-passing the heater core 13, so that a desired temperature of air is obtained after the hot air is mixed with the cool air.

The casing 2 is further provided with a ventilation air outlet 21, a side ventilation outlet 22, a defroster air outlet 23, a heat air outlet 24, a front heat air outlet 25, a rear heat air outlet 26, and a cool air by-pass 27. The ventilation air outlet 21 generates an air flow mainly directed to an upper half part of a passenger; the side ventilation air outlet 22 generates an air flow directed to the side windows of the vehicle and the side of a passenger near the side window; the defroster air outlet 23 generates an air flow directed to a front window of the vehicle; the heat air outlet 24 directs a flow of hot air to the front heat air outlet 25 and rear heat air outlet 26; the front heat air outlet 25 issues a flow of air toward the feet of a passenger; and the rear heat air outlet 26 discharges a flow of air toward the rear passenger seats of the vehicle. The cool air by-pass 27 is a passageway that is opened or closed by a damper (changeover valve) 28 for introducing the cooled air from the evaporator 12 directly into the ventilation air outlet 21 and the side ventilation air outlet 22. The degree of opening of the ventilation air outlet 21, the defroster air outlet 23, and the heat air outlet 24 are respectively controlled by a film damper 3 that is moved in the casing 3 in such a manner that the damper 3 faces the outlet 21, 23 and 24.

The film damper 3 is made of, for example, a flexible polyethylene resin and is connected at both ends thereof to a drive means 4. The film damper 3 has an intermediate portion supported in a stretched manner by a plurality of spaced rolls 31 rotatably supported by the casing 2, and having a plurality of openings 32 formed therein for selectively opening the outlets 21, 23 an 24, respectively. As shown in FIG. 1, the drive means 4 comprises a drive shaft 5, an electric driving motor 6, a driven shaft 41 (FIG. 3), a drive belt 42, and an idler shaft 43. The electric motor 6 is constructed by a motor body 6a and a speed reduction gear 62. The hollow drive shaft 5 constructs a supporting shaft of the present invention, and is rotatably arranged between a first cap 7 and a second cap 8. The drive shaft 5 is made of a resin material, such as an ABS resin or polyethylene resin, and has an axial bore 55 formed therein in which an electric motor 6 is arranged, a sleeve 53 made of a rubber material, and a spiral tension spring 54. An end of the film damper 3 is wound on the drive shaft 5 when the shaft 5 is rotated in the counter clockwise direction in FIG. 3. The end of the film damper 3 is fixed to the outer periphery of the drive shaft 5 by, a holder 56 and a plurality of lugs 57. One end of the holder 56 is engaged with hooks 58 projected from the outer periphery of the drive shaft 5, to thereby press against and hold the end of the film damper 3. The end of the film damper 3 is a provided with a plurality of holes 33 in which the respective lugs 57 on the outer periphery of the drive shaft 5 are fitted.

The sleeve 53 is made of a synthetic rubber material and is used not only for fixedly holding the electric drive motor 6 in the drive shaft 5 but also for preventing a vibration of the motor 6 and a generation of noise therefrom.

The tension spring 54 is connected at one end to a flange portion 61a of the shaft 61, and at the other end is connected to the second cap 8. The tension spring 54 generates a torque for rotating the shaft 5, so that the shaft 5 stretches the film damper 3 under a tension of, for example, 0.3 kg to 0.4 kg, and as a result, a film damper 3 is maintained without slack therein when moved in the casing 2.

The electric motor 6 is an element of the present invention, and can be a direct electric current motor or a stepping motor. The reduction gear 62 of the electric motor 6 is a planetary gear type used for reducing the rotational speed of an output shaft 61 to a desired value. The output shaft 61 is connected to the second cap 8 via the tension spring 54. Furthermore, the electric motor 6 is provided with two terminals 63 and 74, projecting from the left-hand end of the motor 6 in the drawing.

The first cap 7 is made of a polyprophylene resin, for a one-touch snap on and off connection at an opening 29 formed in the casing 2. The first cap 7 is formed with a plurality of hooks 70 engaged with an inner edge of an opening 29 of the casing, and further, is provided with an annular slit 7-1 to which the end of the tubular shaft 5 is inserted. The first cap 7 is also provided, by an insert moulding process, with an annular electric contact (slip ring) 73 and a central electric contact 74 with which the electrodes 63 and 64 extending from the motor 6 are in sliding contact respectively when the device is assembled. The terminal 63 is linearly extended axially, to be brought into contact with the annular contact 73 at a predetermined radial position with respect to the axis of the shaft 5, whereby a contact between the contact 73 and the terminal 63 is obtained by a circular movement caused by a relative movement of the motor 6 and the casing 2. Conversely, the terminal 64 has a separate angle member 64' which is in contact with the contact 74 at the axis of the shaft 5. As a result, the contact 74 is maintained a constant position on the axis and is brought into electrical contact with the terminal 64' by a relative movement of the motor 6 and the casing 2. Such an arrangement of the terminals 63 and 64 of the electric motor 6 with respect to the annular contact 73 and the central contact 74 causes an electrical closed circuit to be created while allowing a relative rotation of the motor 6 and the casing 2.

The second cap 8 is made of a polyprophylene resin, for a one-touch snap on and off connection with the casing 2. Namely, the second cap 8 is formed with a pair of projected catches 80 which are inserted to and engaged with edges of respective openings 29' formed in the casing 2. The second cap 8 is further provided with a boss portion 8-1 freely insertable to the end of the shaft 5 to which the end of the tension spring 54 is connected.

As shown in FIG. 3, the driven shaft 41 is rotatably supported by the casing 2, and the second end of the film damper 3 is connected to the driven shaft 41 in the same way as the first end of the damper 3 is connected to the drive shaft 4. When the driven shaft 41 is rotated in the clock wise direction in FIG. 3, the second end of the film damper 3 is wound on the shaft 41. As is easily understood, the drive shaft 5 can transmit a driving force therefrom to the driven shaft 41 by way of a drive belt 42 looped around the drive pulley portion 5a on the shaft 5, a pulley portion 41a on the driven shaft 41, and an idler shaft 43. The idler shaft 43 is rotatably supported on the casing 2, to stabilize the tension of the drive belt 42.

The operation of the device according to the present invention will be described with reference to FIGS. 1 to 3. When the electric motor 6 is energized, the rotation thereof is transmitted, via the planetary gear type reduction gear, to the output shaft 61, to thus reduce the speed of rotation thereof. The rotation of the output shaft 61 causes the tension spring 54 to be wound around the outer surface of the output shaft 61, and the winding of the tension spring 54 is continued until a locked situation is obtained such that the output shaft 61 is mechanically connected to the second cap 8, i.e., the casing 2. The body 6a of the electric motor 6 is connected to the drive shaft 5 via the sleeve 53 made of a rubber material, so that a relative rotation of the body 6a of the electric motor 6 together with the drive shaft 5 is obtained with respect to the output shaft 61, and as a result, one end of the film damper 3 is wound about the outer surface of the drive shaft 5. The rotation of the drive shaft 5 is transmitted to the driven shaft 41 via the belt 42, which causes the film damper 3 to be moved in the direction of the shaft 5 while facing the air outlets 21, 23 and 24. The motor 6 is de-energized when the opening 32 of the film damper 3 coincides with a desired air outlet, whereby cooled air or hot air is directed into the cabin from the desired air outlet aligned with the opening 32.

In the above construction, the entire drive device 4 for moving the film damper 3 in the casing 2 while facing the air outlets is housed in the casing 2, and as a result, the conventional link mechanism or actuator, which otherwise would be arranged outside the casing 2, can be eliminated according to the present invention, thus enabling the space required for mounting the vehicle air conditioning system 1 to be reduced, compared with the prior art.

Figure 4:
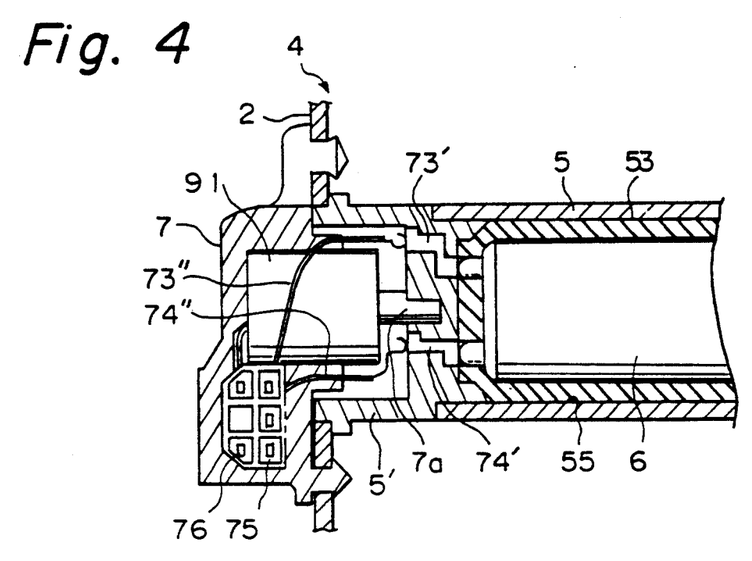
FIG. 4 is a partial view of a drive shaft as a second embodiment of the present invention, and provided with a potentiometer.

FIG. 4 shows a part of FIG. 1, and illustrates another embodiment of the drive device according to the present invention. The drive means 4 in FIG. 4 includes a potentiometer 91 arranged between the electric motor 6 and the first cap 7. The potentiometer 91 has an input shaft 7a connected to the motor 6 via an end 5' of the shaft 5, for imparting a rotational movement to the potentiometer 91. Slip rings 73' and 74' are insert-moulded into the end 5'. The potentiometer 91 detects an angular position of the rotating motor 6 and outputs an electric signal indicating the position at which the film damper 3 is to be stopped, to thereby increase the precision of the positioning of the damper 3. As a result, it is possible to prevent a stopping of the opening 32 of the damper at a position not in register with the desired outlet, and therefore, a desired air flow can be obtained from the outlet.

It should be noted that the first cap 7 is provided, by the insert moulding process, with terminals 75 for wires 73" and 74" to the slip rings 73' and 74' and the potentiometer 91, and terminals 76 for connection to a power supply (not shown).

Figure 5:
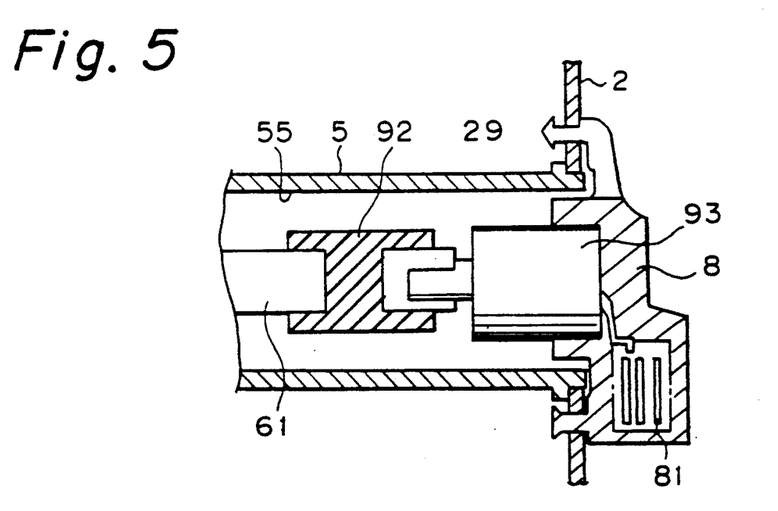
FIG. 5 is a partial view of a drive shaft as a third embodiment of the present invention, and provided with a spring formed as a block of a resistant material.
Figure 6:
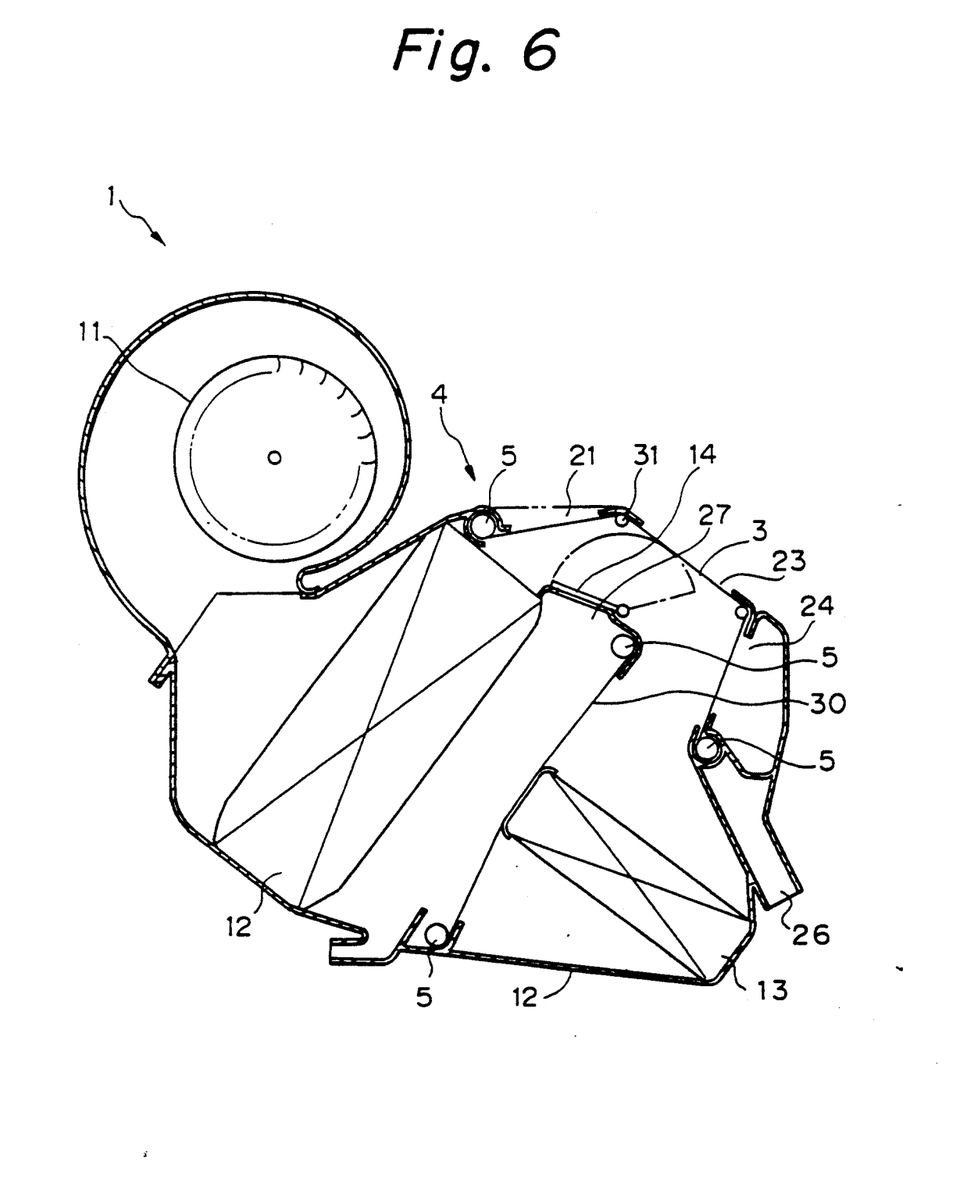
FIG. 6 shows an entire view of an entire air conditioning system for a vehicle provided with the shaft shown in FIG. 5.
Figure 7:
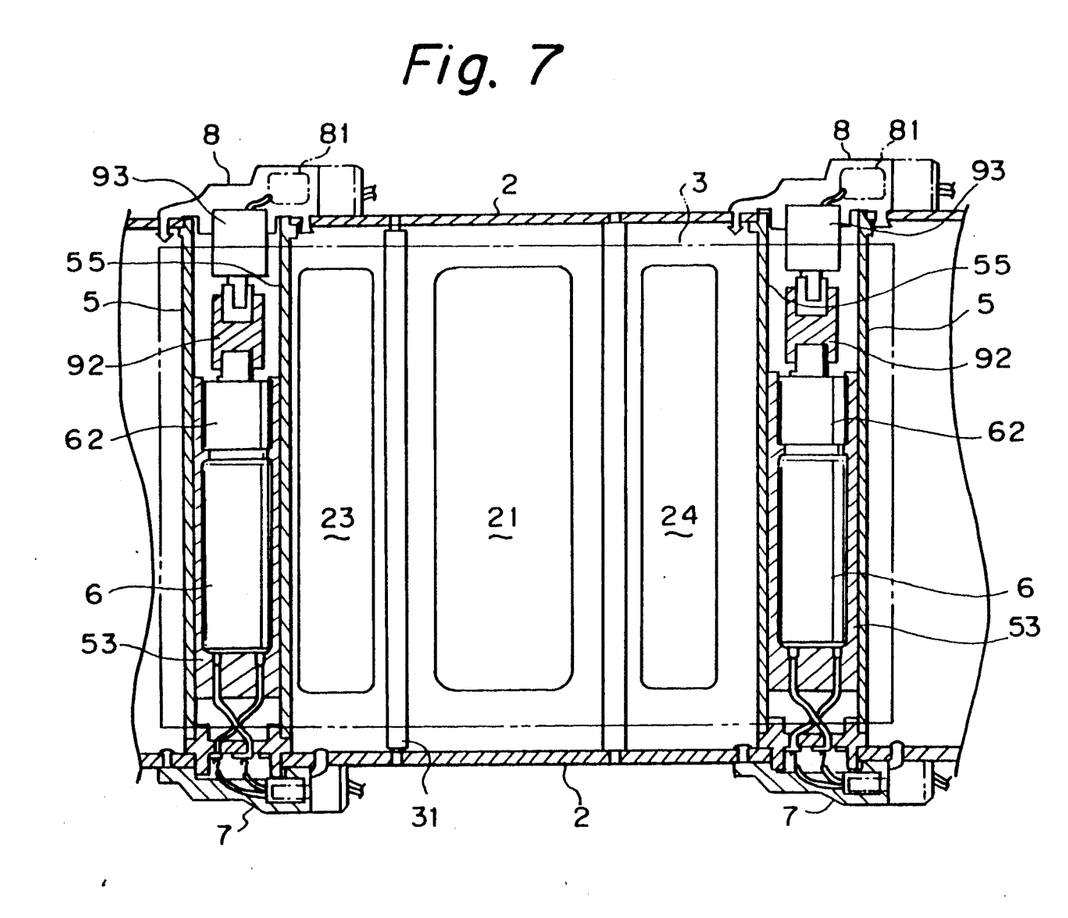
FIG. 7 shows a upper view of system for driving a film damper in the third embodiment.
Figure 8:
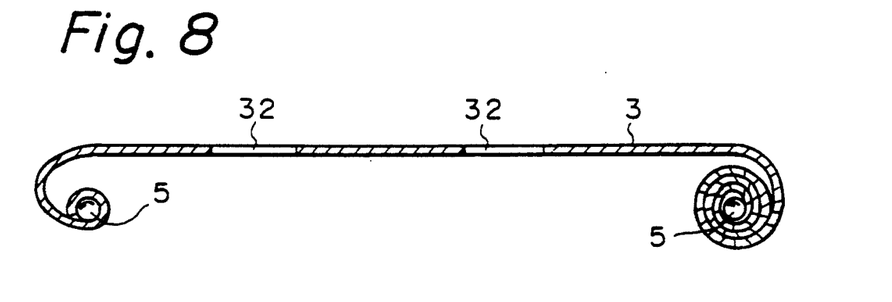
FIG. 8 is a side view of the film damper shown in FIG. 7.

FIGS. 5 to 8 show a third embodiment of the present invention. In FIG. 5, showing the drive device 4, in place of the tension spring 54 used in the first embodiment shown in FIG. 1, a coupling member 92 made of a block of a rubber material is used, and a potentiometer 93 is arranged between the coupling member 92 and the second cap 8. Furthermore, as shown in FIG. 7, the respective motors 6 are stored at both ends of the film damper drive shafts 5. It should be noted that the second cap 8 is provided therein with three insert moulded terminals 81 for connection to the potentiometer 93. In FIG. 6, in addition to the film damper 3 for controlling the flow of air to the ventilation outlet 21, the defroster outlet 23 and the hear air outlet 24, as also shown in FIG. 1, a film damper 30, which acts as the air mix damper 14 in FIG. 1, is provided for controlling the ratio of the amount of air introduced into the heater core 13 to the amount of air by-passing the heater core 13. The construction of the film damper 30 is the same as that of the film damper 3. Namely, the film damper 30 as the air-mix damper is connected at both ends to drive shaft 5 having the same construction as shown in FIGS. 5 and 7.

Figure 9:
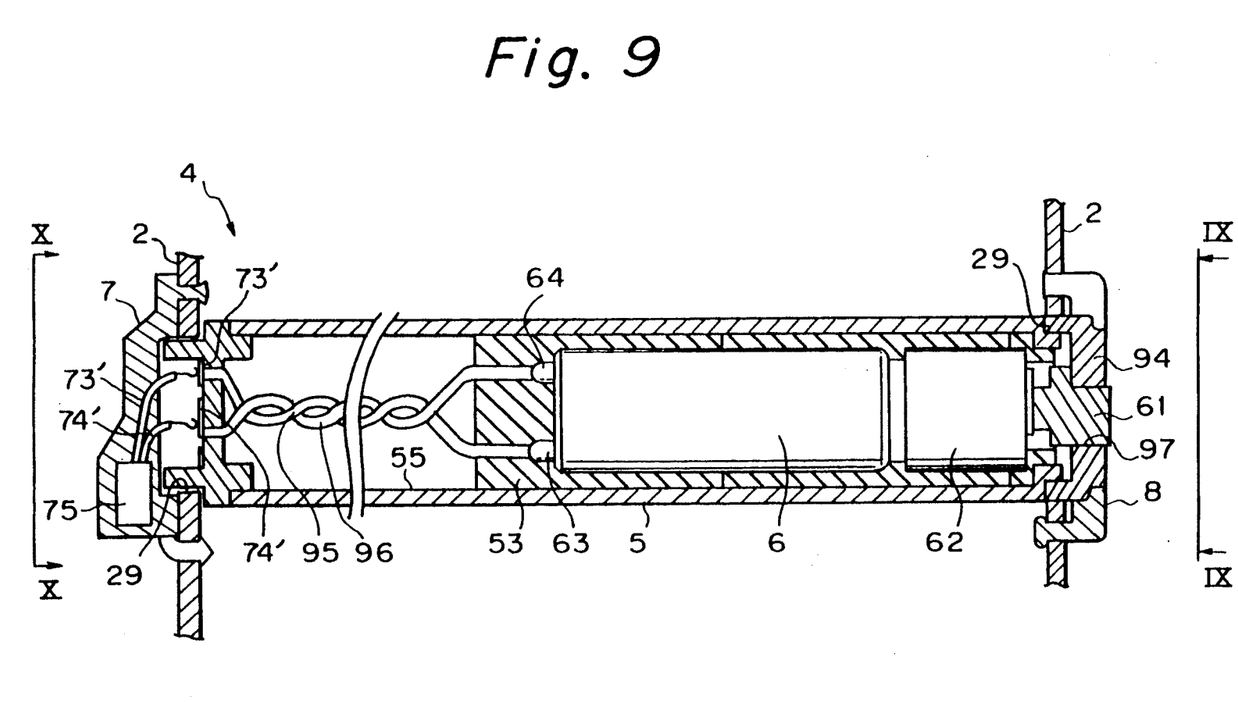
FIG. 9 is a longitudinal cross sectional view of a drive shaft as a fourth embodiment of the present invention.
Figure 10:
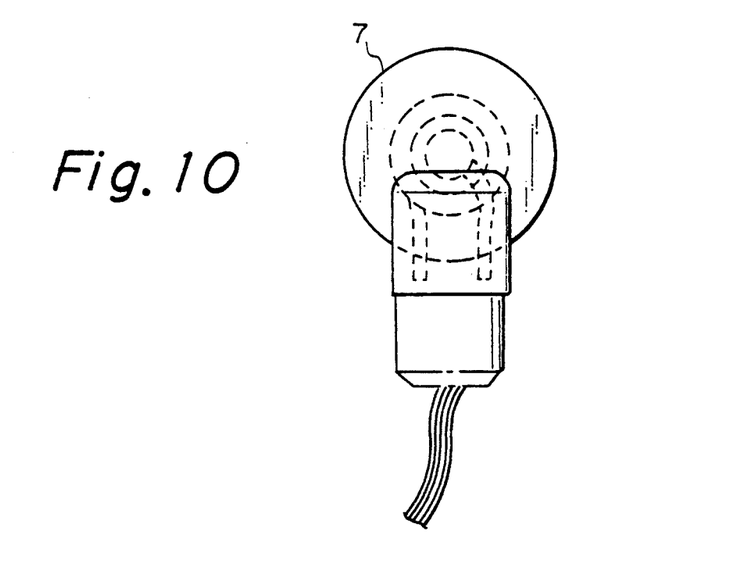
FIG. 10 is side view taken along the line X—X in FIG. 9.
Figure 11:
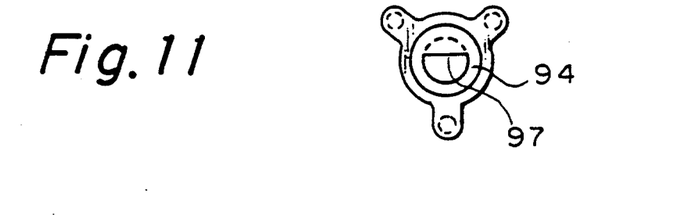
FIG. 11 is side view taken along the line IX—IX in FIG. 9.

FIGS. 9 to 11 show a fourth embodiment of the present invention. The drive device shown in FIGS. 9 and 10 is provided with a electric motor 6 and a planetary gear type speed reduction mechanism 62 arranged on the right-hand side of the axial bore 55 of the drive shaft 5. The outlet shaft 61 from the speed reduction gear 62 is connected to a block 61 made of a hardened rubber material formed in the second cap 8 by an insert moulding process, or is heated and then connected thereto. As shown in FIG. 11, the cap 94 is provided with a semicircular opening 97 to which the output shaft 61 of the corresponding cross-sectional shape is inserted, to thus connect the shaft 61 to the cap 94, while preventing a rotation of the shaft 61 with respect to the cap 94. Furthermore, a twisted wire harness 95 and 96 is used for an electrical connection between the terminals 63 and 64 of the electric motor 6 and the slip rings 73' and 74' in the first cap 7, with which wires 73" and 74" from the connector 75 come into contact.

Figure 12:
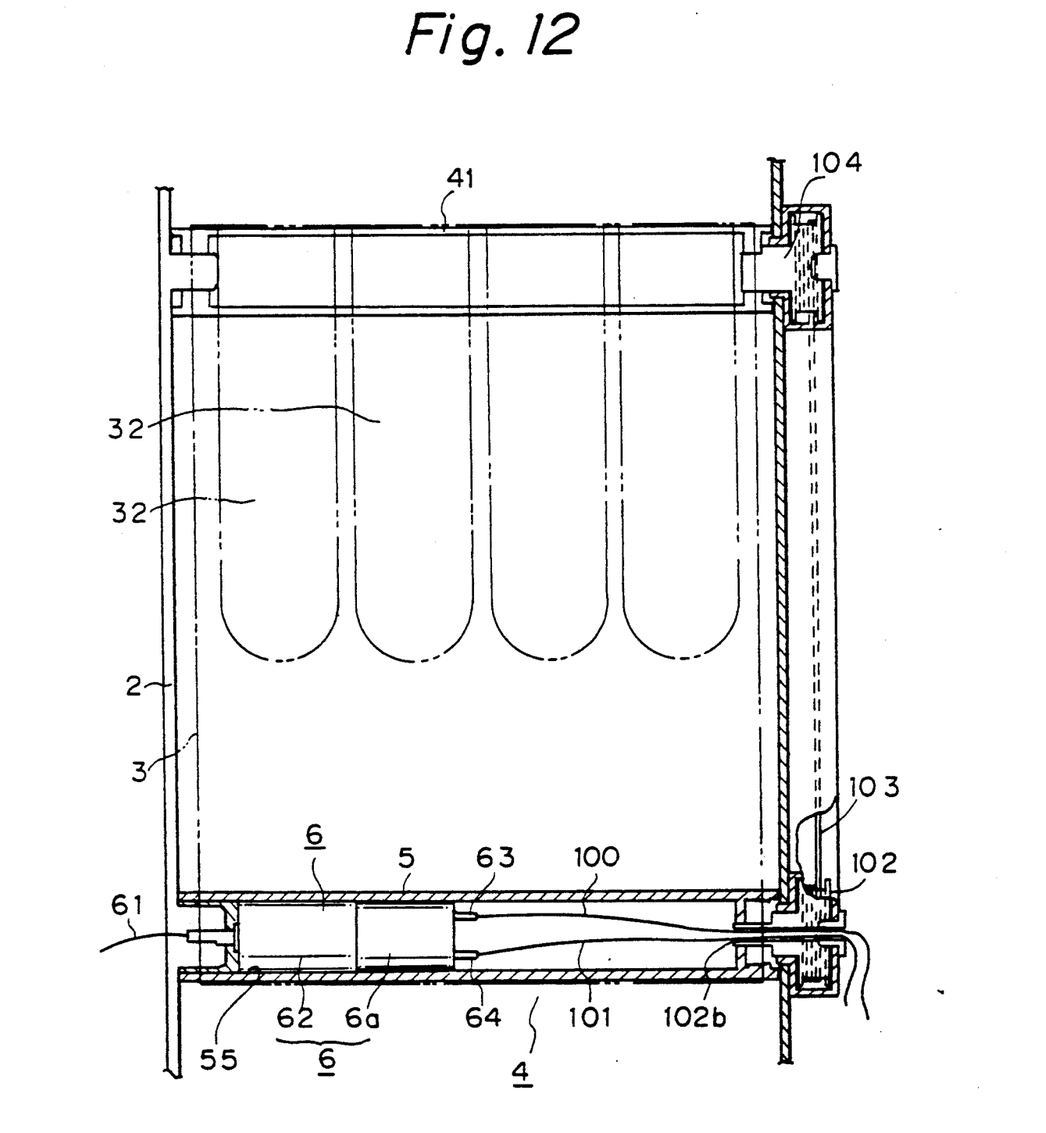
FIG. 12 is an upper view of the drive system for a film damper as a fifth embodiment of the present invention.

FIG. 12 shows a fifth embodiment wherein the drive means 4 has a hollow drive shaft 5 having an axial bore 55 in which an electric motor 6 is housed. Similar to the previous embodiments, the motor 6 is constructed by a motor body 6a and a planetary gear type speed reduction gear 62. The rotation of the electric motor 6 is transmitted via the speed reduction gear 62 to the output shaft 61, which is fixed to a portion 2a of the casing 2, whereby a rotation of the motor body 6a together with the shaft 5 is obtained. The shaft 5 is connected to a pulley 102 rotatably supported at the casing 2. The pulley 102 is connected, via a wire 103, to a pulley 104 rotatably supported by the casing and connected to the driven shaft 41. The driven shaft 41 may have the same construction as that of the drive shaft 5. One of the wire 103 is wound on the pulley 102 and the other end of the wire 103 is wound on the pulley 104. The motor body 6a has terminals 63 and 64 from which flexible wires 100 and 101 extend, respectively, via an opening 102b formed axially along and through the pulley 102 and are taken outside of the pulley 102. A film damper 3 having openings 32 for controlling the flow of air at the air outlets (not shown in FIG. 12 but arranged as shown in FIG. 3 or 6) is stretched between the drive shaft 5 and the driven shaft 41.

The rotation of the drive shaft 5 causes one end of the wire 103 to be wound on to the pulley 102, and accordingly, the other end of the wire 103 is wound off of the pulley 104, whereby the driven shaft 41 is rotated for controlling the flow of air via the air outlets by the damper 3, and thus a designated control of the air flow is obtained.

The above embodiments are all directed to the dampers constructed as a film damper 3, but the concept of the present invention can be realized when the damper is a plate type having a pivotal axis enabling a rotational movement of the plate type damper. Nevertheless, the present invention, when realized as a hollow shaft for storing therein a motor, which inevitably makes the diameter of the shaft larger, is more advantageous when used with the film damper. Namely, due to the large diameter thereof, a small rotation of the shaft is sufficient to obtain a desired movement of the film damper, to thus obtain a necessary control of the outlet opening. Furthermore, when the film damper is wound on the shaft having a large diameter, this reduces the load applied to the film, and thus increases the durability of the film per se.

Although embodiments of the present invention have been described with reference to the attached drawings, obviously many modifications and change can be made

We claim:

1. A flow control apparatus for an air-conditioning system for a vehicle, for controlling a flow of air from a air flow source to a receiver of said flow of air, said flow control;. apparatus comprising:
   a casing defining therein a passageway having one end connected to the air flow source and a second end connected to said air flow receiver;
   a damper arranged in said passageway for controlling a degree of opening of said passageway, and;
   drive means for opening the damper, said drive means comprising a hollow shaft rotatably connected to said casing, said hollow shaft defining therein an axially extending bore and being connected to the damper, and a motor arranged in said bore and having a body and an output shaft rotatable to the body, the output shaft of the motor being connected in relation to said casing and the motor body being fitted to the hollow shaft, whereby an energization of the motor body obtains a relative rotation of the body and the output shaft, which allows the hollow shaft to be rotated with respect to said casing to thereby move the damper for an operation thereof.

2. An apparatus according to claim 1, further comprising a resilient member having a first end connected to said output shaft of the motor and a second end opposite to the first end, and means for connecting the second end to the body so that the relative rotation thereof initially causes the spring to be deformed, and a predetermined amount of elastic energy thus stored then allows the output shaft to be fixedly connected to the casing.

3. An apparatus according to claim 2, wherein said resilient means comprise a coil spring wound around said output shaft of the motor.

4. An apparatus according to claim 2, wherein said resilient means comprise a block made of a rubber material.

5. An apparatus according to claim 1, wherein said motor is an electric motor having means for an electric connection of the motor to the outside thereof while allowing a relative rotation of the motor body with respect to the casing.

6. An apparatus according to claim 5, wherein said electric connection means comprise a pair of sliding members of the motor body, and a pair of contacts on the casing, the sliding members maintaining contact with said corresponding contacts during the relative rotation of the motor body with respect to the casing.

7. An apparatus according to claim 1, further comprising a potentiometer connected to the drive shaft, for outputting a signal indicating an angular position of the drive shaft.

8. An apparatus according to claim 1, wherein said motor further comprise a rotational speed reduction gear provided between the motor body and the output shaft.

9. An apparatus according to claim 1, wherein said damper is a film damper comprising a continuous sheet having a first end connected to said drive shaft and to be wound thereon, the apparatus further comprising a driven shaft spaced from the drive shaft, the other end of the film damper being connected to the driven shaft to be wound thereon, and means for rotating the driven shaft synchronously with the rotation of the drive shaft.

10. An apparatus according to claim 9, wherein said means for rotating the driven shaft comprise pulleys fitted to the drive and driven shafts, and a belt connecting the pulleys.

11. An apparatus according to claim 9, wherein said driven shaft is a hollow shaft rotatably connected to said casing, said hollow shaft defining therein an axially extending bore and being connected to the damper, and a motor arranged in said bore and having a motor body and an output shaft, the output shaft of the motor being connected in relation to the motor body and the motor body being fitted to the hollow shaft, whereby an energization of the motor body obtains a relative rotation of the motor body and the output shaft, which allows the hollow shaft to be rotated with respect to the casing, the rotation of the drive and driven shafts causing the film damper to be moved to control the air outlets.

* * * * *